(12) United States Patent
Namuduri et al.

(10) Patent No.: US 11,658,474 B2
(45) Date of Patent: May 23, 2023

(54) SMART ELECTRONICALLY RESETTABLE FUSE

(71) Applicant: GM Global Technology Operations LLC, Detroit, MI (US)

(72) Inventors: Chandra S. Namuduri, Troy, MI (US); Muhammad Hussain Alvi, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/467,913

(22) Filed: Sep. 7, 2021

(65) Prior Publication Data

US 2023/0073390 A1 Mar. 9, 2023

(51) Int. Cl.
| | | |
|---|---|---|
| *H02H 3/087* | (2006.01) | |
| *H02H 3/06* | (2006.01) | |
| *H02H 6/00* | (2006.01) | |
| *B60L 50/60* | (2019.01) | |
| *H01H 85/20* | (2006.01) | |

(52) U.S. Cl.
CPC .............. *H02H 3/087* (2013.01); *H02H 3/06* (2013.01); *H02H 6/005* (2013.01); *B60L 50/60* (2019.02); *H01H 85/20* (2013.01)

(58) Field of Classification Search
CPC ...... H02H 3/087; H02H 3/093; H02H 3/0935; H02H 5/04-048; H02H 6/00; H02H 6/005; B60L 50/60
See application file for complete search history.

(56) References Cited

U.S. PATENT DOCUMENTS

| | | | |
|---|---|---|---|
| 2016/0257202 A1* | 9/2016 | Chatroux | ................ B60L 58/10 |
| 2022/0069560 A1* | 3/2022 | Bernardoni | .............. H02H 3/08 |

* cited by examiner

*Primary Examiner* — Jared Fureman
*Assistant Examiner* — Christopher J Clark
(74) *Attorney, Agent, or Firm* — Cantor Colburn LLP

(57) ABSTRACT

Examples described herein provide a computer-implemented method that includes monitoring, using a microcontroller, an electric circuit of a vehicle, the electric comprising a battery source and a load. The battery source supplies electric power to the load. The method further includes detecting, using the microcontroller, a high current event in the electric circuit by comparing a current level of a current flowing through the electric circuit to a time-based current threshold. The method further includes responsive to detecting the high current event, controlling a gate driver to cause a switch of an electronically resettable fuse to open the electric circuit to stop the flow of the current through the electric circuit.

20 Claims, 6 Drawing Sheets

SMART ELECTRONICALLY RESETTABLE FUSE

INTRODUCTION

The present disclosure relates to vehicles and more particularly to a smart electronically resettable fuse.

An electrified vehicle powertrain may include an electrical system having separate high-voltage and low-voltage buses. While "high-voltage" and "low-voltage" are relative terms, "low-voltage" can encompass a maximum voltage level of twelve to fifteen volts (i.e., an auxiliary voltage) with the term "high-voltage" describing voltage levels well above auxiliary voltage levels. An electrified vehicle propulsion system, for instance, may have a maximum bus voltage ranging between sixty and eight hundred volts, with certain emerging battery packs having a voltage capacity ranging between five hundred and eight hundred volts.

Strategically-positioned high-current fuses and high-voltage switches help ensure voltage isolation in the event of a fault condition within a high-voltage bus, with the switches also opened during routine shut down procedures. Fuses are circuit elements that can default to open circuit state in response to a threshold battery pack current.

SUMMARY

In one exemplary embodiment, a computer-implemented method includes monitoring, using a microcontroller, an electric circuit of a vehicle, the electric having a battery source and a load. The battery source supplies electric power to the load. The method further includes detecting, using the microcontroller, a high current event in the electric circuit by comparing a current level of a current flowing through the electric circuit to a time-based current threshold. The method further includes, responsive to detecting the high current event, controlling a gate driver to cause a switch of an electronically resettable fuse to open the electric circuit to stop the flow of the current through the electric circuit.

In addition to one or more of the features described herein, or as an alternative, further embodiments of the method may include that the time-based current threshold includes a time limit and a current level limit.

In addition to one or more of the features described herein, or as an alternative, further embodiments of the method may include that the high current event is detected responsive to determining that the current level of the current flowing through the electric circuit meets or exceeds the current level limit for a duration exceeding the time limit.

In addition to one or more of the features described herein, or as an alternative, further embodiments of the method may include detecting, using the microcontroller, an instantaneous high current event in the electric circuit by comparing the current level of the current flowing through the electric circuit to an instantaneous current threshold.

In addition to one or more of the features described herein, or as an alternative, further embodiments of the method may include that the time-based current threshold is a first time-based current threshold, and the method further includes detecting, using the microcontroller, a high current event in the electric circuit by comparing a current level of a current flowing through the electric circuit to a second time-based current threshold.

In addition to one or more of the features described herein, or as an alternative, further embodiments of the method may include that the first time-based current threshold includes a first time limit and a first current level limit, that the second time-based current threshold includes a second time limit and a second current level limit, that the first current level is less than the second current level limit, and that the first time limit is greater than the second time limit.

In addition to one or more of the features described herein, or as an alternative, further embodiments of the method may include that the high current event is detected responsive to one of: determining that the current level of the current flowing through the electric circuit exceeds the first current level limit for a first duration exceeding the first time limit; or determining that the current level of the current flowing through the electric circuit exceeds the second current level limit for a second duration exceeding the second time limit.

In addition to one or more of the features described herein, or as an alternative, further embodiments of the method may include that the electronically resettable fuse is a metal-oxide-semiconductor field-effect transistor (MOSFET).

In addition to one or more of the features described herein, or as an alternative, further embodiments of the method may include that the electric circuit includes a high voltage portion and a low voltage portion, and that the microcontroller and the gate driver are operably connected to the electric circuit in the high voltage portion.

In addition to one or more of the features described herein, or as an alternative, further embodiments of the method may include that the electric circuit includes a high voltage portion and a low voltage portion, and that the microcontroller is operably connected to the electric circuit in the low voltage portion.

In addition to one or more of the features described herein, or as an alternative, further embodiments of the method may include adjusting the time-based current threshold over time.

In addition to one or more of the features described herein, or as an alternative, further embodiments of the method may include adjusting the time-based current threshold based at least in part on an operating condition of the vehicle.

In addition to one or more of the features described herein, or as an alternative, further embodiments of the method may include detecting, using the microcontroller, a high temperature event by comparing a programmable temperature-based threshold to a temperature sensed by a temperature sensor. The method may further include, responsive to detecting the high temperature event, controlling the gate driver to cause the switch of an electronically resettable fuse to open the electric circuit to stop the flow of the current through the electric circuit.

In another exemplary embodiment an electric circuit that includes an electric motor operable using electric power. The electric circuit further includes a battery source to provide the electric power to the electric motor. The electric circuit further includes an electronically resettable fuse to selectively enable the electric power to flow through the electric circuit from the battery source to the electric motor. The electric circuit further includes a gate driver to operate the electronically resettable fuse. The electric circuit further includes a microcontroller. The microcontroller detect a high current event in the electric circuit by comparing a current level of a current flowing through the electric circuit to a time-based current threshold and, responsive to detecting the high current event, controls the gate driver to cause the electronically resettable fuse to open the electric circuit to stop the flow of the current to the electric motor.

In addition to one or more of the features described herein, or as an alternative, further embodiments of the method may include the time-based current threshold includes a time limit and a current level limit.

In addition to one or more of the features described herein, or as an alternative, further embodiments of the method may include the high current event is detected responsive to determining that the current level of the current flowing through the electric circuit meets or exceeds the current level limit for a duration exceeding the time limit.

In addition to one or more of the features described herein, or as an alternative, further embodiments of the method may include that the electronically resettable fuse is a metal-oxide-semiconductor field-effect transistor (MOSFET).

In addition to one or more of the features described herein, or as an alternative, further embodiments of the method may include that the electric circuit includes a high voltage portion and a low voltage portion, and that the microcontroller and the gate driver are operably connected to the electric circuit in the high voltage portion.

In addition to one or more of the features described herein, or as an alternative, further embodiments of the method may include the electric circuit includes a high voltage portion and a low voltage portion, and that the microcontroller is operably connected to the electric circuit in the low voltage portion.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
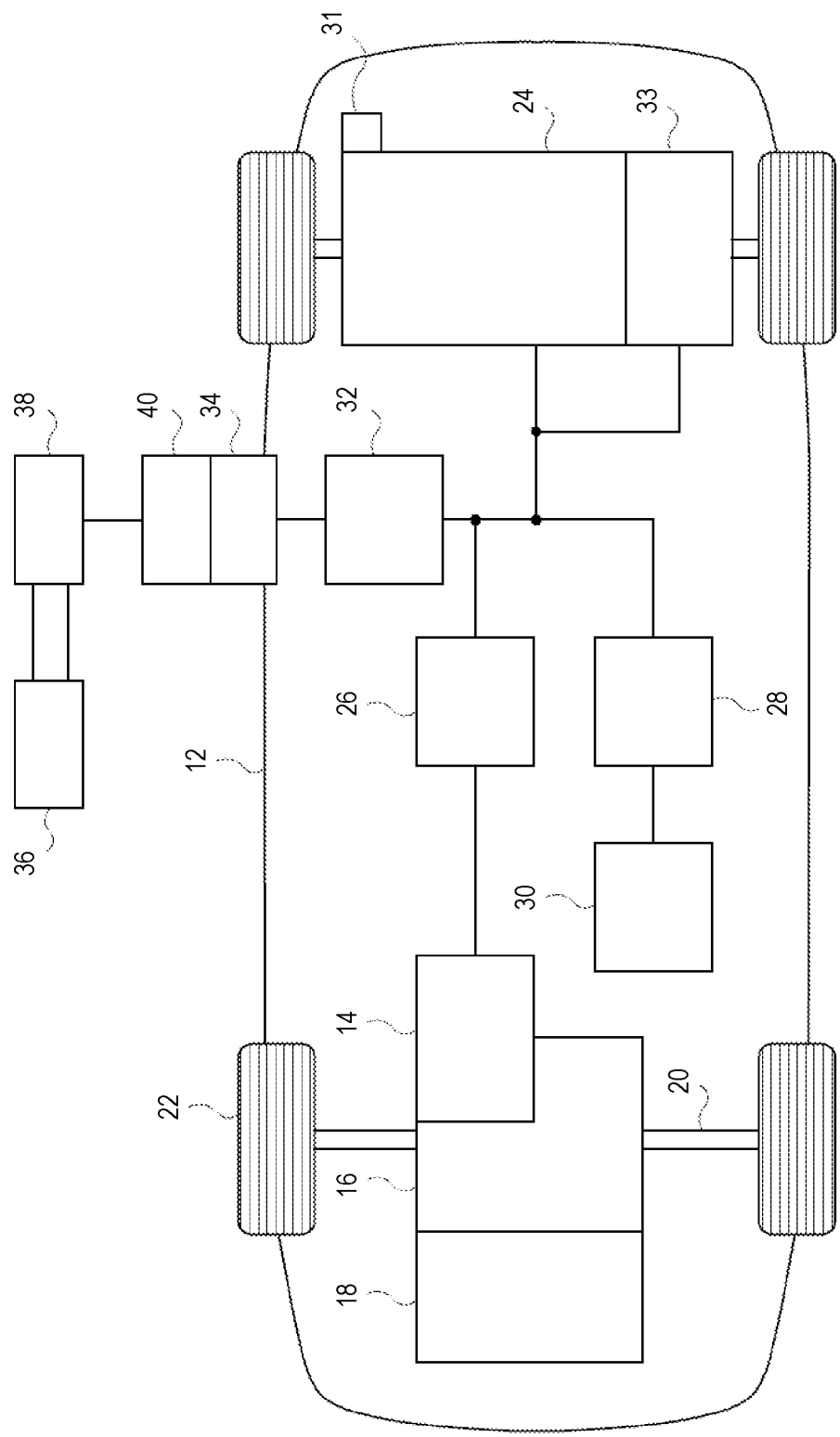
FIG. 1 depicts a schematic of an example of a plug-in hybrid-electric vehicle (PHEV) according to one or more embodiments described herein.

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Fuses are circuit elements that can transition from a closed state to an open state (e.g., an open circuit) to prevent current flow when current exceeds a certain threshold. Resettable fuses can transition between closed states and open states based on the current flow within an electrical system. For example, resettable fuses can transition to the open state to mitigate overcurrent faults within the electrical system.

The technical solutions described herein provide for a selectively controllable (smart) electronically resettable fuse to detect high current events (overcurrent) to prevent the high current from causing damage, such as to a power source or load. According to one or more embodiments described herein, a control architecture is provided that implements an isolation boundary, a microcontroller, and sensors to provide intelligences to an electronically resettable fuse to provide multiple functionalities and application-based optimization. As used herein, an electronically resettable fuse can include, among other things, a semiconductor based fuse. Such a control architecture provides fast response times, is resettable, is low maintenance, and is independent of operating conditions.

Conventional approaches to overcurrent detection are insufficient. For example, traditional fuses use resistive heating to melt a current carrying element to protect the downstream system from overcurrent damage. Such conventional approaches are slow, with typical response times of 5-100 s of milliseconds, do not support multiple or adjustable thresholds for overcurrent, and are susceptible to false trigger events. These conventional approaches also require maintenance (e.g., replacement after the occurrence of an overcurrent event).

One or more embodiments described herein address these and other shortcomings of the prior art by using a microcontroller to monitor an electric circuit, detect a high current event in the electric circuit based on a time-based current threshold, and control a gate driver to cause an electronically resettable fuse to open the electric circuit to stop the flow of the current. In an embodiment, a control and sensing architecture is provided for microsecond scale shutdown (response time) while avoiding false triggers. In an embodiment, fault detection (e.g., a high current (or "overcurrent") event) is based upon one or more thresholds that are time-based and can be adjusted. As used herein, a time-based current threshold is a threshold that has a time limit and a current level limit. A fault (e.g., a high current event) is said to occur when the current level limit is exceeded for a duration that meets or exceeds the time limit. In an embodiment, system diagnostics can be performed using data driven fault detection. In an embodiment, a defined isolation boundary can be used to define portions of the circuit as high voltage and low voltage, and suitable components can be used within the high and low voltage portions.

One or more embodiments herein provide improvements over conventional fuses because electronically resettable fuses are faster, resettable, and precise; avoid false triggers by using a control system (e.g., a microcontroller) to detect and shutdown faults with fast response time; and can be made smarter to provide multi-functionality by utilizing sensing of current, voltage, and temperature. These and other advantages are described in more detail herein.

FIG. 1 depicts a schematic of an example of a plug-in hybrid-electric vehicle (PHEV). A vehicle 12 may include one or more electric machines 14 mechanically connected to a hybrid transmission 16. The electric machines 14 may be capable of operating as a motor and/or a generator. In addition, the hybrid transmission 16 can be mechanically connected to an engine 18. The hybrid transmission 16 can also be mechanically connected to a drive shaft 20 that is mechanically connected to the wheels 22. The electric machines 14 can provide propulsion and deceleration capability when the engine 18 is turned on or off or is not present. The electric machines 14 may also function as generators and can provide fuel economy benefits by recovering energy that would normally be lost as heat in the friction braking system.

A traction battery 24 (e.g., a battery pack) stores and provides energy that can be used by the electric machines 14 or other vehicle 12 components. The traction battery 24 typically provides a high voltage DC output from one or more battery cell arrays, sometimes referred to as battery cell stacks, within the traction battery 24. The high voltage DC output may also be converted to a low voltage DC output for applications such as vehicle stop/start. The battery cell arrays may include one or more battery cells. The traction battery 24 may be electrically connected to one or more power inverter modules 26 through one or more contactors. The one or more contactors isolate the traction battery 24 from other components when opened and connect the traction battery 24 to other components when closed. The power inverter module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may use a three-phase AC voltage to function. The power inverter module 26 may convert the DC voltage to a three-phase AC voltage as used by the electric machines 14. In a regenerative mode, the power inverter module 26 may convert the three-phase AC voltage from the electric machines 14 acting as generators to the DC voltage used by the traction battery 24. The description herein may be applicable to a pure electric vehicle or other hybrid vehicles. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical vehicle electrical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may function as a controller for the traction battery 24 and may also include an electronic monitoring system that manages temperature and charge state of each of the battery cells. The traction battery 24 may have a temperature sensor 31, such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a plug-in hybrid-electric vehicle (PHEV), a full hybrid-electric vehicle (FHEV), a mild hybrid-electric vehicle (MHEV), or a battery electric vehicle (BEV) in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Figure 2:
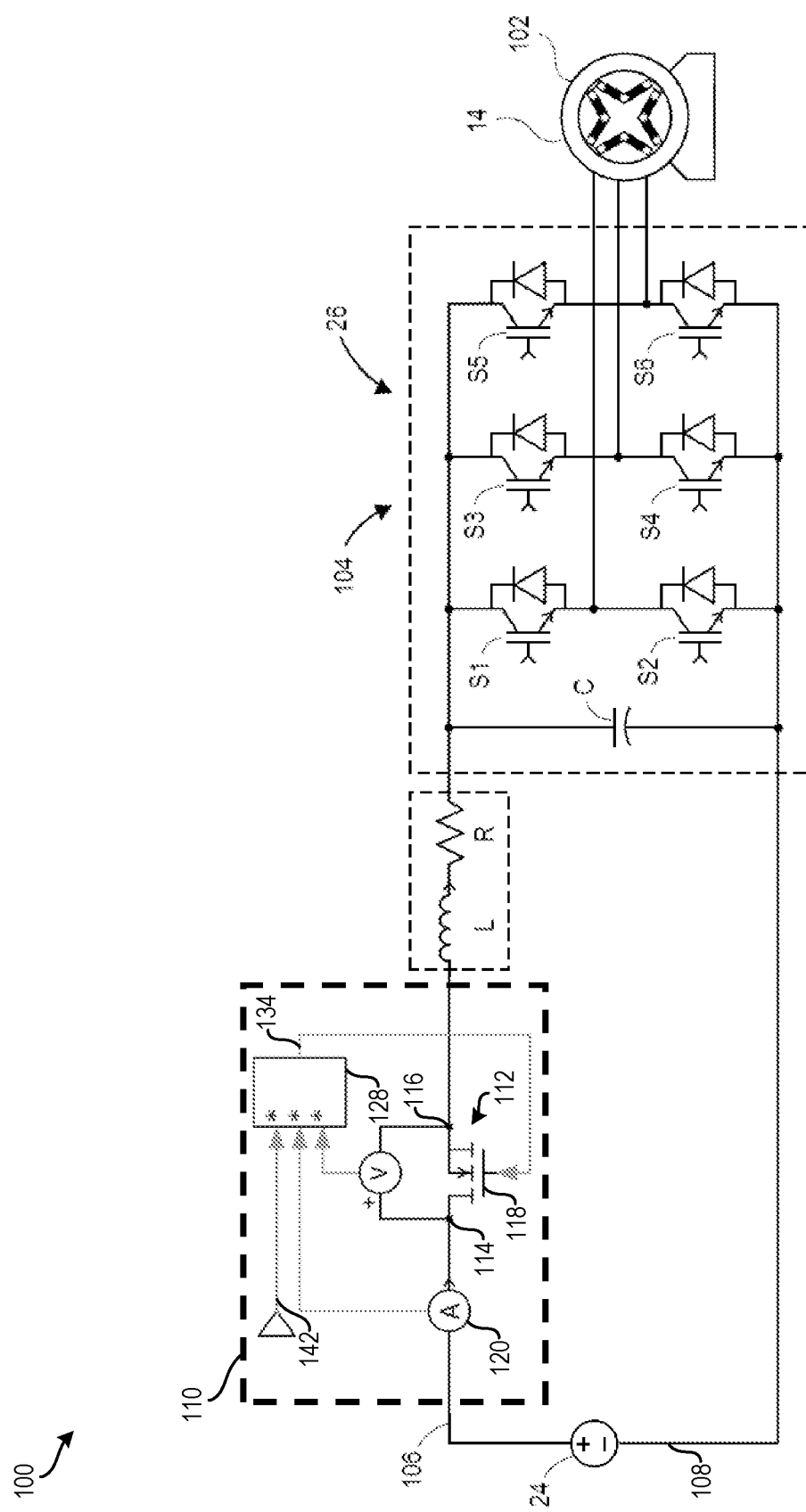
FIG. 2 depicts an example electrical system that includes the traction battery, the power inverter module, and the electric machine of FIG. 1 according to one or more embodiments described herein.

FIG. 2 depicts an example electrical system 100 that includes the traction battery 24, the power inverter module 26, and the electric machine 14. In FIG. 2, the electric machine 14 is illustrated as a traction motor 102.

The power inverter module 26 may include a set 104 of semiconductor switches S1, S2, S3, S4, S5, S6 (also referred to herein as "inverter switches") that cooperatively convert direct current (DC) power from the traction battery 24 to alternating current (AC) power for powering the traction motor 102 via high frequency switching during vehicle operation (e.g., a motoring mode of operation). Each semiconductor switch S1-S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch. There is typically at least one pair of semiconductor switches for each phase of the three-phase traction motor 102. Each pair of switches (e.g., switches S1 and S2 (Phase A), switches S3 and S4 (Phase B), and switches S5 and S6 (Phase C)), may be referred to as phase legs of the power inverter module 26. For example, the power inverter module 26 may include at least three (3) phase legs in an example implementation. Each phase leg of the power inverter module 26 is connected to a corresponding machine phase terminal of the traction motor 102. A DC link capacitor C can be connected across positive and negative connectors 106, 108 as illustrated in FIG. 2.

The electrical system 100 further includes an electronically resettable fuse device 110. As shown, the electronically resettable fuse device 110 can be connected between the traction battery 24 and the power inverter module 26. Reference characters L and R represent inductance and resistive circuit elements, respectively, that can electrically connect the electronically resettable fuse device 110 and the power inverter module 26. In example implementation, the electrical connection may include any suitable electrical connections, such as an electrical connector (e.g., an electrical cable).

The electronically resettable fuse device 110 can be used to provide control and protection to power electronics (e.g., the electric machines 14) as well as a power source (e.g., the traction battery 24). The electronically resettable fuse device 110 can cause current to cease flowing in the electric circuit based on present and/or historical current levels. This provides for fast fault detection without false triggers. Further, this data driven approach provides for diagnosing fault conditions. For example, predictions can be made based on waveforms of the electronically resettable fuse device 110, which can then be used to set thresholds for the present vehicle 12 and/or for other vehicles.

The electronically resettable fuse device 110 can include a switch 112, such as a voltage-controlled switching device. Examples of voltage-controlled switching devices are described above with reference to the power inverter module 26. For example, the switch 112 can be an IGBT, MOSFET, superjunction MOSFET, FET, JFET, semiconductor power switching device made of Silicon, SiC, GaN or other WBG or UWBG materials, or other suitable switch having a corresponding gate to which a gate signal is applied to change the on/off state of a given switch. The switch 112 includes a first terminal 114, a second terminal 116, and a gate terminal 118. The first terminal 114 and the second terminal 116 can be arranged such that the switch 112 is in series along the positive connector 106 to control current flow between the traction battery 24 and the power inverter module 26.

The electronically resettable fuse device 110 can also include a sensor 120. According to one or more embodiments described herein, the sensor 120 can be a current sensor, a temperature sensor, a voltage sensor, or any other suitable sensor (including combinations thereof) to sense a condition of the electrical system 100. In an example in which the sensor 120 is a current sensor, the sensor 120 can be connected along the positive connector 106 and measure an amount of current passing through the positive connector 106 (e.g., a current level of a current flowing through the electric circuit). In this example, the sensor 120 can be or include any suitable sensor that can directly measure current and generate a signal indicative of a measured overcurrent. The sensor 120 can be configured to generate the overcurrent signal based on an instantaneous current threshold, such as a predetermined value above a maximum operating current. For example, the sensor 120 can measure the current level to detect an instantaneous high current event in the electric circuit by comparing the current level of the current flowing through the electric circuit to the instantaneous current threshold. In an example where the sensor 120 is a temperature sensor, the electronically resettable fuse device 110 can trigger a shutdown (i.e., open the electric circuit to prevent the flow of electricity through the electric circuit) based upon a high temperature condition, which an be determined using a temperature threshold. In another example where the sensor 120 is a voltage sensor, the electronically resettable fuse device 110 can trigger a shutdown (i.e., open the electric circuit to prevent the flow of electricity through the electric circuit) based upon a high voltage condition, which an be determined using a voltage threshold.

Operation of the electronically resettable fuse device 110 can be controlled by detecting a high current event in an electric circuit (e.g., the electrical system 100) by comparing a current level of current flowing through the electric circuit to a time-based current threshold and then controlling a controller gate driver element 128 connected to the switch 112 as shown in FIG. 2. According to one or more embodiments described herein, the controller gate driver element 128 includes a gate driver and a controller (e.g., a microcontroller) to provide a control signal to the gate driver to apply the signal to the switch 112. As an example, with reference to FIG. 3A, the controller gate driver element 328 includes an isolation transformer 326, an iso-SPI driver 329, a microcontroller 320, a gate driver 328, and an isolated power supply 332, although other configurations of controller gate driver elements are possible. As described herein, the time-based current threshold is a threshold that has a time limit and a current level limit. A fault (e.g., a high current event) is said to occur when the current level limit is exceeded for a duration that meets or exceeds the time limit. During operation, the electronically resettable fuse device 110 can allow current flow through the electrical system 100. However, in the event that a high current event is detected based on the time-based current threshold (e.g., the current level of the current flowing through the electric circuit meets or exceeds the current level limit for a duration exceeding the time limit), the electronically resettable fuse device 110 can prevent current flow until a reset signal 142 is received.

The controller gate driver element 128 can receive input as shown. The input can be the voltage across the switch 112 (via the first terminal 114 and the second terminal 116), the output of the current sensor 120, and the reset signal 142. The controller gate driver element 128 can measure a voltage drop across the switch 112 via the first terminal 114 and the second terminal 116, which may correspond to a short circuit fault current. The controller gate driver element 128 can also receive a reset signal 142 that can cause the controller gate driver element 128 to output the control signal that transitions the switch 112 from the open state to the closed state.

The controller gate driver element 128 can generate a control signal that controls operation of the switch 112 based on the received inputs. For example, the controller gate driver element 128 may be a MOSFET driver that translates the received input signals to corresponding voltage signals that control operation of the switch 112. The switch 112 can transition between an open state (e.g., an off-state) and a closed state (e.g., an on-state). In the open state, the switch 112 prevents current flowing through the electric circuit, and the switch 112 allows current to flow through the electric circuit when in the closed state. The controller gate driver element 128 can provide the control signal to the gate terminal 118 of the switch 112 via an output 134.

Figure 3A:
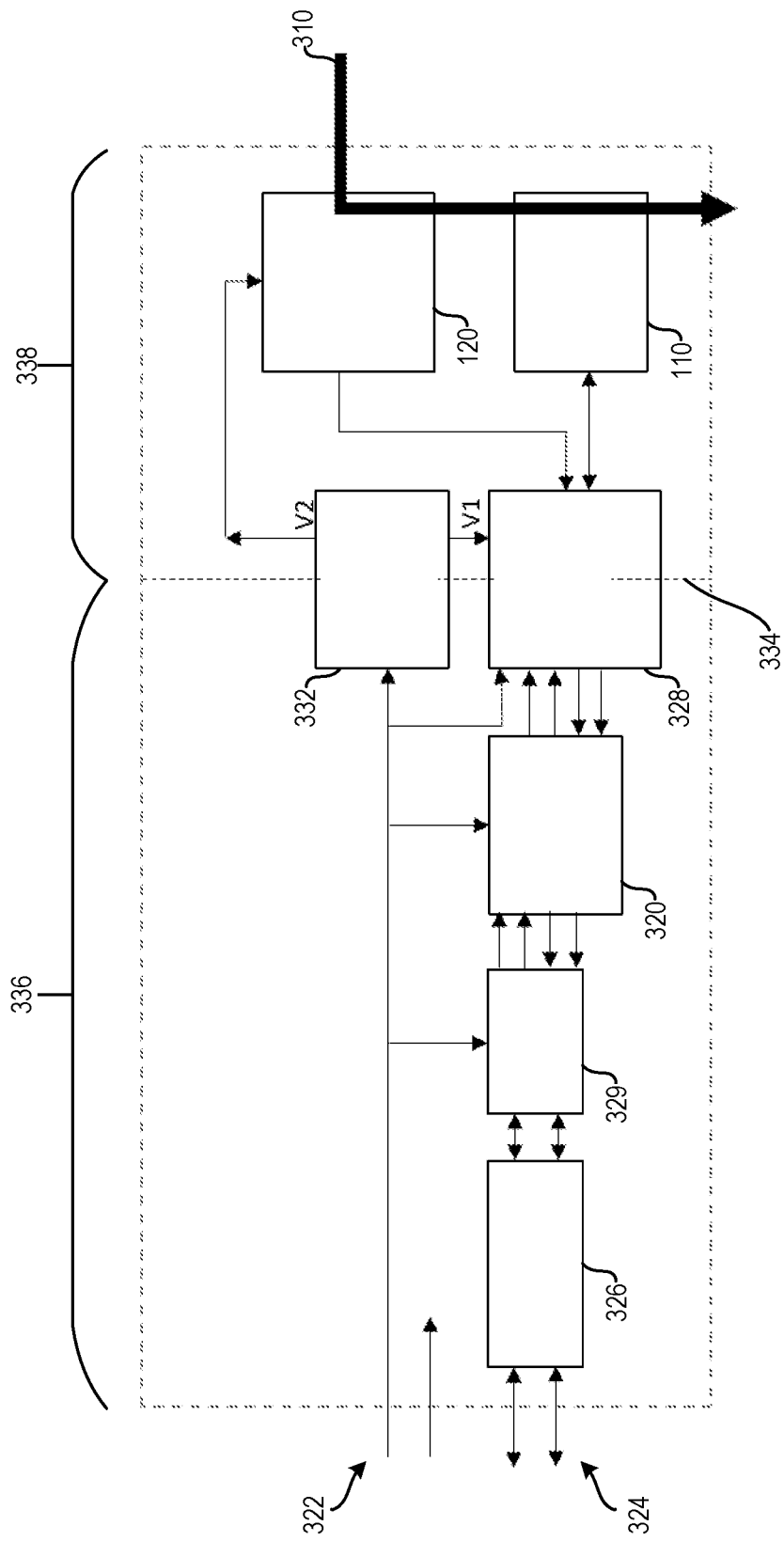
FIGS. 3A and 3B depict examples of isolation boundary configurations for an electric circuit according to one or more embodiments described herein.
Figure 3B:
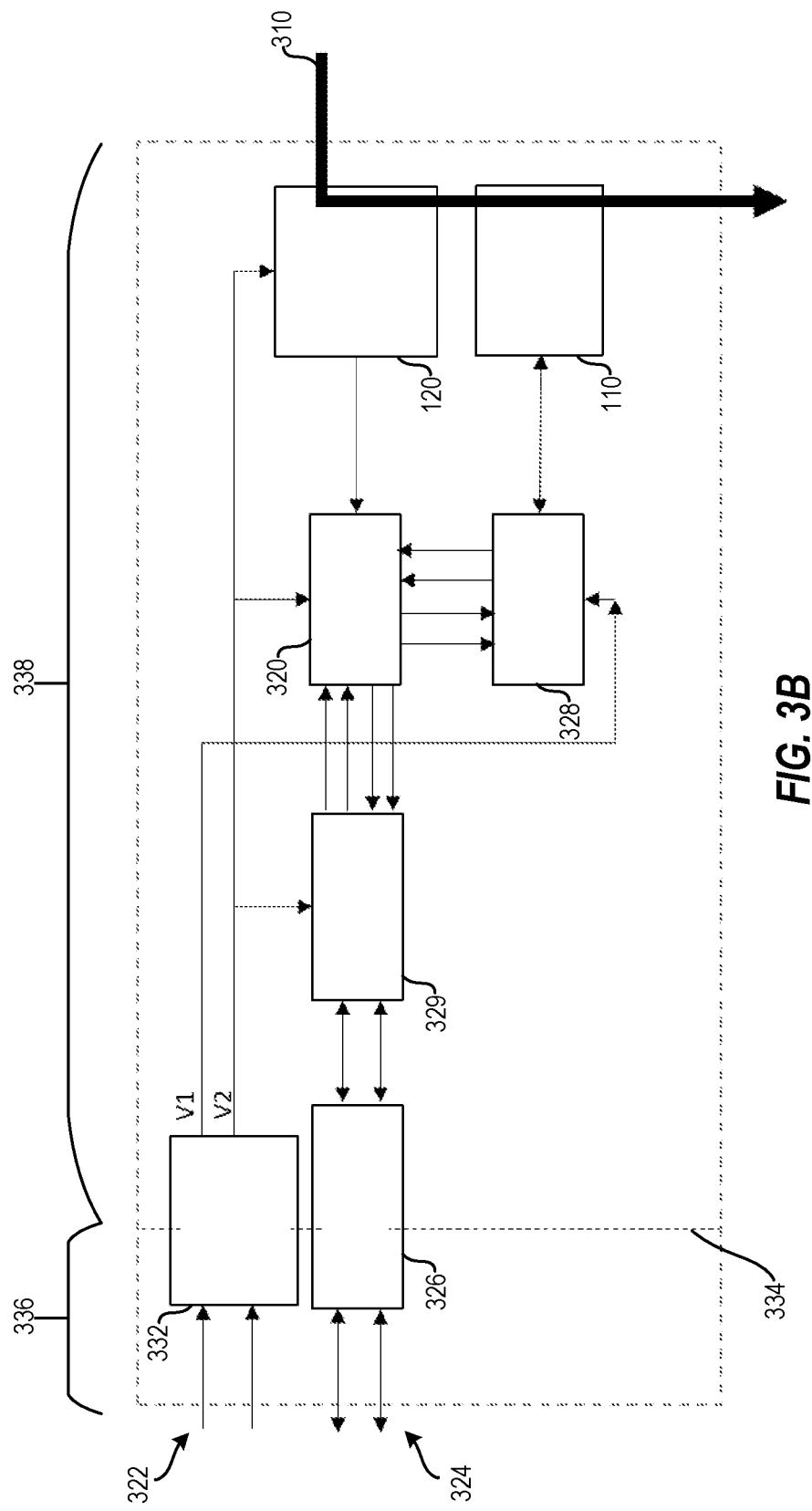

In some examples, such as the examples shown in FIGS. 3A and 3B, a microcontroller can be used to control a gate driver 328. Particularly, FIGS. 3A and 3B depict schematic diagrams of the electronically resettable fuse device 110 controlled by a microcontroller 320. As shown, a high power current 310 flows through the sensor 120 and the electronically resettable fuse device 110 (see also, FIG. 2) of the electric circuit.

An isolation boundary 334 separates a low voltage portion 336 of the electric circuit from a high voltage portion 338 of the electric circuit. The electric circuit can include high voltage components that are positioned within the low voltage portion 336 and high voltage components that are positioned within the high voltage portion 338 or via versa meaning low voltage components on high voltage side. Bias power 322 and control signals 324 are received at the low voltage portion 336.

As can be seen by comparing FIGS. 3A and 3B, the isolation boundary 334 can be located at different points within the electric circuit to isolate the low voltage portion 336 from the high voltage portion 338. In each case, the sensor 120 and the electronically resettable fuse device 110 are located within the high voltage portion 338. However, other components can be low or high voltage components depending on the location of the isolation boundary 334. For example, in FIG. 3A, an isolated transformer 326, an iso-SPI (serial peripheral interface) driver 329, and the microcontroller 320 are arranged within the low voltage portion 336 as shown. An isolated power supply 332 and the gate driver 328 sit on the isolation boundary 334 and thus interact with both components in the high voltage portion 338 and components in the low voltage portion 336.

In the example of FIG. 3B, the isolation boundary 334 is shifted such that more of the components are arranged within the high voltage portion 338. Specifically, the microcontroller 320, the gate driver 328, and the iso-SPI driver 329 are arranged in the high voltage portion 338 of the electric circuit as shown along with the sensor 120 and the electronically resettable fuse device 110. The isolated transformer 326 and the isolated power supply 332 sit on the isolation boundary 334 and thus interact with both components in the high voltage portion 338 and components in the low voltage portion 336.

In the example of FIG. 3A, the microcontroller 320 is positioned within the low voltage portion 336. However, this arrangement uses a relatively more complex and/or expensive gate driver 328 in contrast to the example of FIG. 3B. More particularly, the example of FIG. 3B positions the microcontroller 320 within the high voltage portion 338 so that a relatively less complex and/or expensive gate driver 328 can be implemented.

Figure 4:
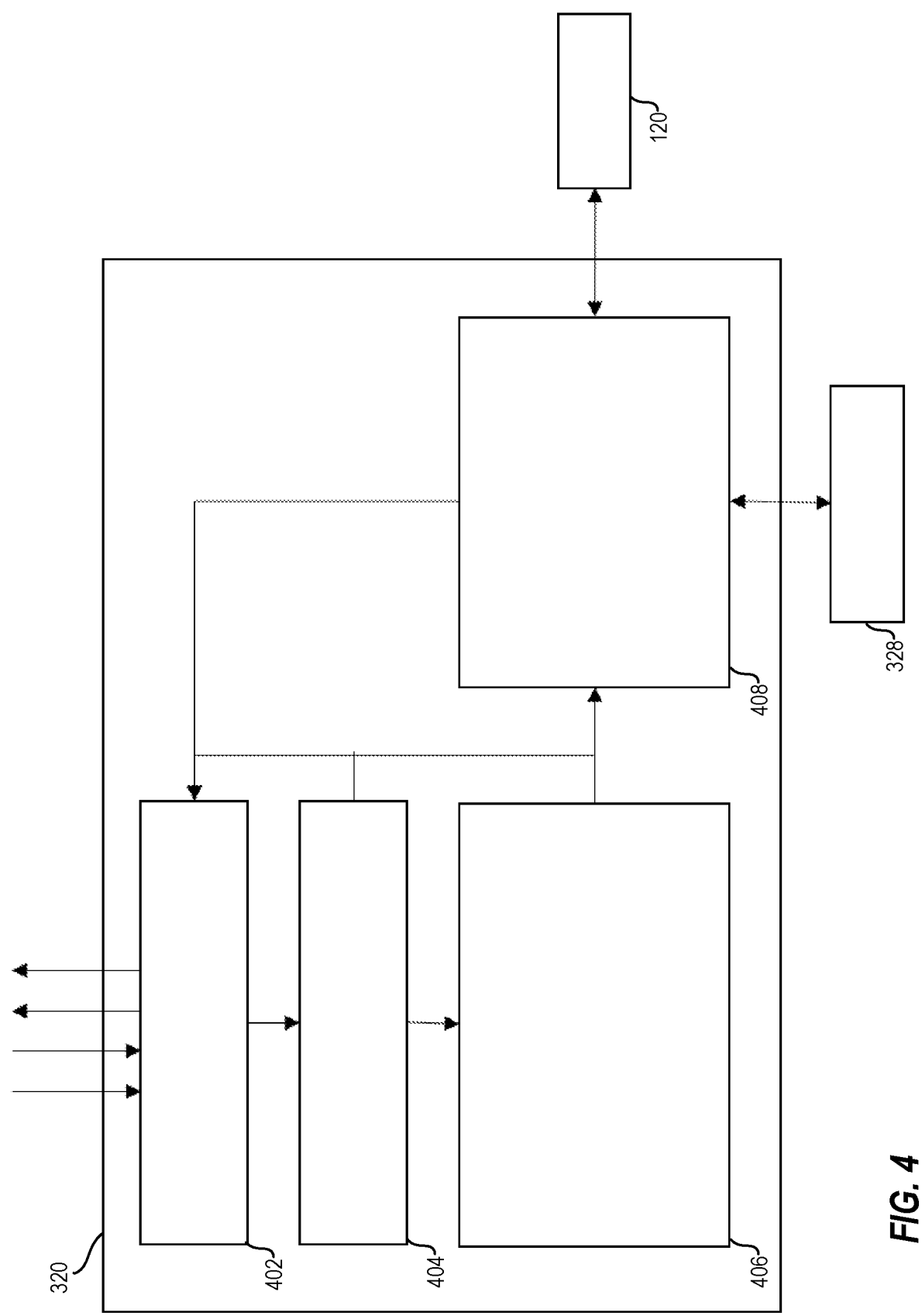
FIG. 4 depicts a schematic diagram of the microcontroller of FIGS. 3A and 3B according to one or more embodiments described herein.

FIG. 4 depicts schematic diagram of the microcontroller 320 of FIGS. 3A and 3B according to one or more embodiments described herein. Although labeled as a microcontroller, the microcontroller 320 can be any suitable type of processing device for executing programmatic instructions. The microcontroller 320 can include, for example, a processor for executing programmatic instructions stored in a memory. Examples of the microcontroller 320 can include a system on a chip, a programmable logic controller (PLC), a digital signal processor (DSP), and the like. According to one or more embodiments described herein, the microcontroller 320 can include, for example, a processor for executing programmatic instructions stored in a memory.

The microcontroller 320 maintains system integrity and functionality. The microcontroller 320 also generates gate responses for the gate driver 328 based on feedback from the sensor 120 and other information (e.g., historical data).

At block 402, the microcontroller 320 interfaces with a master controller (not shown), such as via the control signals 324 of FIGS. 3A and 3B. This can include sending and/or receiving data/information between the microcontroller 320 and the master controller. For example, if the microcontroller 320 detects a high current event, the microcontroller 320 can alert the master controller. As another example, the master controller can communicate threshold settings to the microcontroller 320 to adjust one or more thresholds, such as the time-based current threshold, the instantaneous current threshold, etc., as described herein.

At block 404, the microcontroller 320 is initialized. This can include a boot process for the microcontroller 320.

At block 406, the microcontroller 320 performs communication checks. For example, the microcontroller 320 can establish and/or test communication between itself and various devices, such as a low voltage power supply (e.g., the isolated power supply 332), a high voltage power supply (e.g., the traction battery 24), a gate driver (e.g., the gate driver 328), sensors (e.g., the sensor 120), and the like.

At block 408, the microcontroller 320 performs tasks that can include reading commands, reading sensor feedbacks/data, generating gate control outputs, and the like. The features and functionality of the microprocessor, including the block 408, are described with further reference to FIG. 5.

Figure 5:
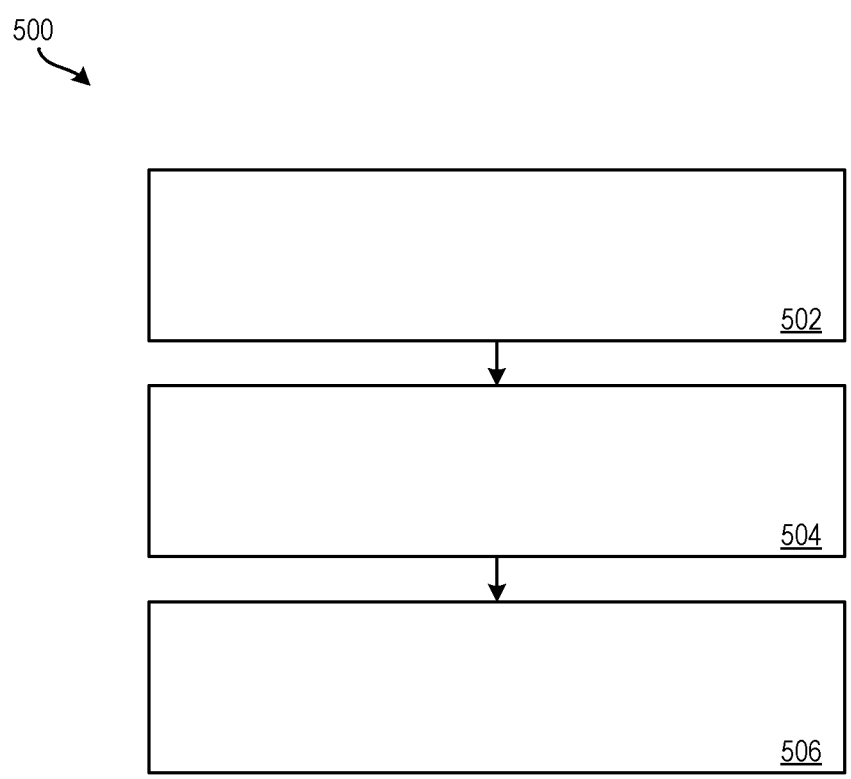
FIG. 5 depicts a flow diagram of a method for monitoring an electric circuit according to one or more embodiments described herein.

In particular, FIG. 5 depicts a flow diagram of a method 500 for monitoring an electric circuit according to one or more embodiments described herein. The method 500 can be performed by any suitable system or device such as the microcontroller 320 of FIGS. 3A, 3B, and 4, or any other suitable processing system and/or processing device (e.g., a processor). The method 500 is now described with reference to the elements of FIGS. 2-4 but is not so limited.

At block 502, the microcontroller 320 monitors an electric circuit (e.g., the electrical system 100) of a vehicle (e.g., the vehicle 12). As described herein, the electric circuit includes battery source (e.g., the traction battery 24) and a load (e.g., the electric machine 14) such that the battery source supplies electric power to the load. Particularly, the microcontroller 320 monitors the electric circuit to detect a high current event in the electric circuit. For example, at block 504, the microcontroller 320 detects a high current event in the electric circuit by comparing a current level of a current flowing through the electric circuit to a time-based current threshold. The microcontroller 320 can receive the current level from a sensor (e.g., the sensor 120).

As described herein, the time-based current threshold includes a time limit and a current level limit. The microcontroller 320 detects a high current event responsive to determining that the current level of the current flowing through the electric circuit meets or exceeds the current level limit for a duration exceeding the time limit. In some examples, multiple time-based current thresholds can be implemented, for example, a first time-based current threshold and a second time-based current threshold. The multiple time-based current thresholds can be different combinations of current level limits and time limits. For example, a first time-based current threshold could set a current level limit of 200 amps for a time limit of 0.5 seconds while a second time-based current threshold could set a current level limit of 300 amps for a time limit of 0.1 seconds. In the case of multiple time-based current thresholds, the microcontroller 320 can detect a high current event responsive to determining that the current level of the current flowing through the electric circuit exceeds the first current level limit for a first duration exceeding the first time limit or determining that the current level of the current flowing through the electric circuit exceeds the second current level limit for a second duration exceeding the second time limit.

According to one or more embodiments described herein, the time-based current threshold can be adjusted. Adjusting the threshold provides for considering lifetime-based factors of the load. For example, a certain load may be more susceptible to failure due to a high current event as that load ages. In such cases, the time-based current threshold can be adjusted (e.g., the time limit can be shortened and/or the current level limit can be lowered). In some examples, the time-based current threshold can be adjusted based at least in part on an operating condition of the vehicle (e.g., ambient temperature, elevation/altitude, etc.). In yet another example, the time-based current threshold can be adjusted based on data collected from other vehicles. For example, if it becomes apparent (based on data from other vehicles) that a particular type of electric load is susceptible to failure at a time-based current threshold other than what is originally set, the time-based current threshold can be adjusted.

The microcontroller 320 can also detect an instantaneous high current event. For example, the microcontroller 320 detects an instantaneous high current event in the electric circuit by comparing the current level of the current flowing through the electric circuit to an instantaneous current threshold. The instantaneous current threshold includes a current level limit but no time-based component or limit. Thus, if the current level exceeds the instantaneous current threshold for any amount of time, an instantaneous high current event is said to have occurred.

Responsive to a high current event being detected at block 504, the microcontroller 320, at block 506, controls, a gate driver (e.g., the gate driver 328) to cause a switch (e.g., the switch 112) of an electronically resettable fuse (e.g., the electronically resettable fuse device 110) to open the electric circuit to stop the flow of the current to the electric motor. Particularly, the microcontroller 320 can cause the gate driver 328 of the electronically resettable fuse device 110 to open the switch 112 to stop the flow of the current to the electric motor.

Additional processes also may be included, and it should be understood that the process depicted in FIG. 5 represents an illustration and that other processes may be added or existing processes may be removed, modified, or rearranged without departing from the scope and spirit of the present disclosure.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A method comprising:
    monitoring, using a microcontroller, an electric circuit of a vehicle, the electric circuit comprising a battery source and a load, wherein the battery source supplies electric power to the load;
    detecting, using the microcontroller, a high current event in the electric circuit by comparing a current level of a current flowing through the electric circuit to a time-based current threshold;
    responsive to detecting the high current event, controlling a gate driver to cause a switch of an electronically resettable fuse to open the electric circuit to stop the flow of the current through the electric circuit; and
    updating the time-based current threshold based at least in part on data collected form other vehicles.

2. The method of claim 1, wherein the time-based current threshold comprises a time limit and a current level limit.

3. The method of claim 2, wherein the high current event is detected responsive to determining that the current level of the current flowing through the electric circuit meets or exceeds the current level limit for a duration exceeding the time limit.

4. The method of claim 1, further comprising detecting, using the microcontroller, an instantaneous high current event in the electric circuit by comparing the current level of the current flowing through the electric circuit to an instantaneous current threshold.

5. The method of claim 1, wherein the time-based current threshold is a first time-based current threshold, wherein the method further comprises detecting, using the microcontroller, a high current event in the electric circuit by comparing a current level of a current flowing through the electric circuit to a second time-based current threshold.

6. The method of claim 5, wherein the first time-based current threshold comprises a first time limit and a first current level limit, wherein the second time-based current threshold comprises a second time limit and a second current level limit, wherein the first current level is less than the second current level limit, and wherein the first time limit is greater than the second time limit.

7. The method of claim 6, wherein the high current event is detected responsive to one of:
    determining that the current level of the current flowing through the electric circuit exceeds the first current level limit for a first duration exceeding the first time limit; or
    determining that the current level of the current flowing through the electric circuit exceeds the second current level limit for a second duration exceeding the second time limit.

8. The method of claim 1, wherein the electronically resettable fuse is a metal-oxide-semiconductor field-effect transistor (MOSFET).

9. The method of claim 1, wherein the microcontroller and the gate driver are operably connected to the electric circuit in the high voltage portion.

10. The method of claim 1, wherein the microcontroller is operably connected to the electric circuit in the low voltage portion.

11. The method of claim 1, further comprising adjusting the time-based current threshold over time.

12. The method of claim 1, further comprising adjusting the time-based current threshold based at least in part on an operating condition of the vehicle.

13. The method of claim 1, further comprising:
detecting, using the microcontroller, a high temperature event by comparing a programmable temperature-based threshold to a temperature sensed by a temperature sensor; and
responsive to detecting the high temperature event, controlling the gate driver to cause the switch of an electronically resettable fuse to open the electric circuit to stop the flow of the current through the electric circuit.

14. An electric circuit, comprising:
an electric motor operable using electric power;
a battery source to provide the electric power to the electric motor;
an electronically resettable fuse to selectively enable the electric power to flow through the electric circuit from the battery source to the electric motor;
a gate driver to operate the electronically resettable fuse; and
a microcontroller to:
detect a high current event in the electric circuit by comparing a current level of a current flowing through the electric circuit to a time-based current threshold;
responsive to detecting the high current event, control the gate driver to cause the electronically resettable fuse to open the electric circuit to stop the flow of the current to the electric motor; and
update the time-based current threshold based at least in part on data collected from other vehicles.

15. The electric circuit of claim 14, wherein the time-based current threshold comprises a time limit and a current level limit.

16. The electric circuit of claim 15, wherein the high current event is detected responsive to determining that the current level of the current flowing through the electric circuit meets or exceeds the current level limit for a duration exceeding the time limit.

17. The electric circuit of claim 14, wherein the electronically resettable fuse is a metal-oxide-semiconductor field-effect transistor (MOSFET).

18. The electric circuit of claim 14, wherein the electric circuit comprises a high voltage portion and a low voltage portion, wherein the microcontroller and the gate driver are operably connected to the electric circuit in the high voltage portion.

19. The electric circuit of claim 14, wherein the electric circuit comprises a high voltage portion and a low voltage portion, wherein the microcontroller is operably connected to the electric circuit in the low voltage portion.

20. A vehicle comprising:
an electric motor operable using electric power;
a battery source to provide the electric power to the electric motor; and
an electronically resettable fuse to selectively enable the electric power to flow through an electric circuit from the battery source to the electric motor;
a gate driver to operate the electronically resettable fuse; and
a microcontroller to:
detect a high current event in the electric circuit by comparing a current level of a current flowing through the electric circuit to a time-based current threshold;
responsive to detecting the high current event, control the gate driver to cause the electronically resettable fuse to open the electric circuit to stop the flow of the current to the electric motor; and
update the time-based current threshold based at least in part on an elevation of the vehicle.

* * * * *